Aug. 10, 1926.
S. J. COX ET AL
1,595,502
MACHINE FOR CUTTING POTATOES INTO STRIPS
Filed Jan. 29, 1925    2 Sheets-Sheet 1
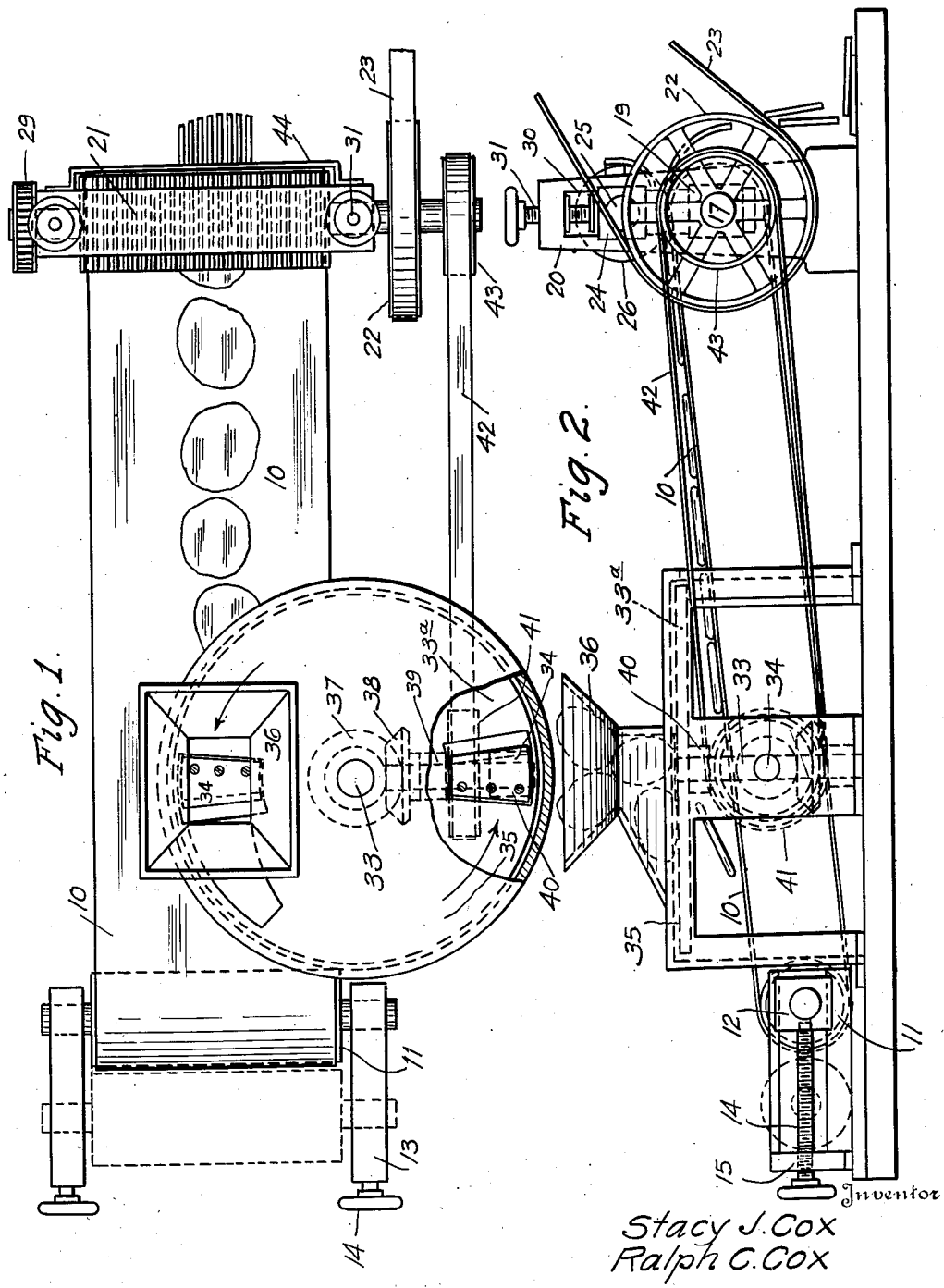
Inventor
Stacy J. Cox
Ralph C. Cox
By Watson E. Coleman
Attorney Aug. 10, 1926.
S. J. COX ET AL
1,595,502
MACHINE FOR CUTTING POTATOES INTO STRIPS
Filed Jan. 29, 1925    2 Sheets-Sheet 2
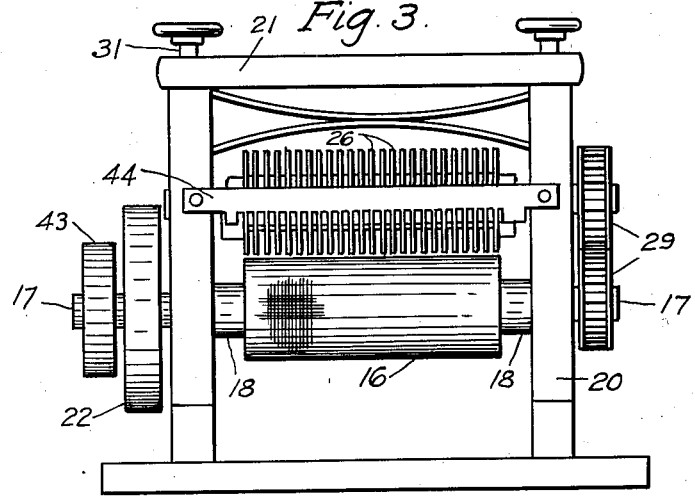
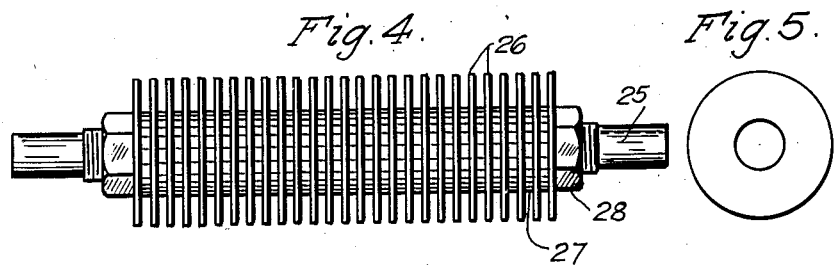
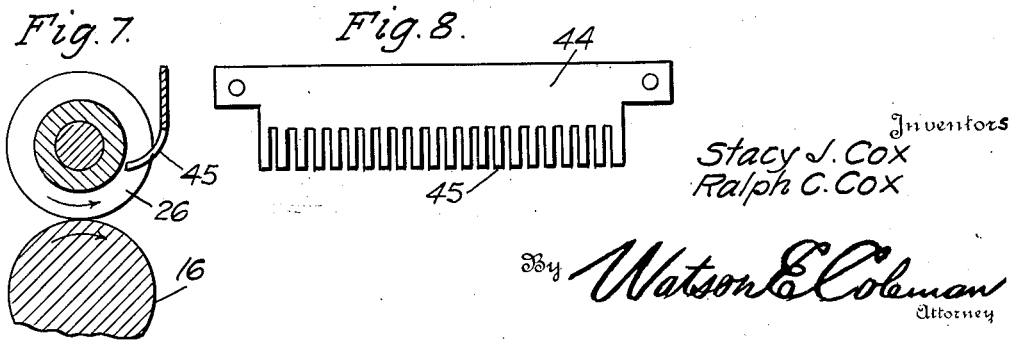
Inventors
Stacy J. Cox
Ralph C. Cox
By Watson E. Coleman
Attorney Patented Aug. 10, 1926.

1,595,502

UNITED STATES PATENT OFFICE.

STACY J. COX AND RALPH C. COX, OF DENVER, COLORADO.

MACHINE FOR CUTTING POTATOES INTO STRIPS.

Application filed January 29, 1925. Serial No. 5,596.

This invention relates to machines for cutting potatoes, and particularly to a machine for cutting potatoes into long strips known as "shoe string" potatoes.

Heretofore shoe string potatoes have been made by hand, that is the potatoes are sliced either in a slicing machine or by hand, and then these slices are cut up into long strips which are relatively square in cross section. Potatoes, or indeed any vegetable, after they have been pared are very liable to deteriorate by handling, and furthermore it is difficult to handle potatoes in slices as the slices tend to adhere to each other and to crumple up and turn in the hands so that where potatoes are sliced, for instance, and then later on cut up into long strips or cubes, these cubes are not in the condition which they should be in for proper cooking or consumption.

The general object of the present invention is to provide means whereby these potato strips or shoe string potatoes may be made by machinery and at a rapid rate.

A further object is to provide a machine of this character having a series of cutting disks and having a slicer with a conveyor upon which the slices of potatoes are deposited, this conveyor carrying the slices of potatoes to the "shredder" or to the series of disks whereby the potatoes are cut into strips.

A still further object is to provide means whereby a device of this kind may be operated by power and whereby the potato strips or shoe strings shall be caused to leave the cutting disks and be discharged at the end of the machine.

Other objects have to do with the details of construction and arrangement of parts as will appear more fully hereinafter.

Our invention is illustrated in the accompanying drawings, wherein:—

Figure 1 is a top plan view of a machine constructed in accordance with our invention;

Figure 2 is a side elevation of the machine shown in Figure 1;

Figure 3 is an end elevation thereof;

Figure 4 is an elevation of the shredding or slice-cutting rollers;

Figure 5 is an elevation of one of the cutting disks;

Figure 6 is an elevation of the conveyor roller over which the conveyor belt passes;

Figure 7 is a fragmentary vertical section through the conveyor roller and the cutting shaft and its disks;

Figure 8 is a front elevation of the means for stripping the strip-cutting disks and spacing members from the strips or "shoe strings" of potatoes.

Referring to these drawings, 10 designates a conveyor belt, which at one end is supported by a roller 11 mounted in bearings 12, these bearings being longitudinally slidable on guides 13 and being shifted longitudinally by screws 14 extending through the end walls 15 of the guides. The opposite end of this conveyor belt is mounted upon a roller 16 carried upon a driving shaft 17, there being shoulders 18 at the ends of the rollers 16. This driving shaft 17 is mounted in suitable bearings 19 in the standards 20 of a supporting frame, the standards being connected by a transverse cross piece 21 at their upper ends.

The elevator belt 10 extends preferably at an inclination upward and forward in the direction of travel of the belt and carried upon the shaft 17 is a driving pulley 22 which is driven by a belt 23 from any suitable source of power. Mounted in slidable bearings 24 in the supporting standards 20 is a shaft 25 which supports upon it a plurality of cutting disks 26 spaced from each other by spacing washers or members 27. These cutting disks 26 are separated from each other a distance equal to the width of a potato strip or shoe string and the series of cutting disks and the series of spacers 27 are held in engagement with each other and in fixed relation by means of nuts 28 which have screw-threaded engagement with the shaft 25. Mounted upon the shaft 17 and upon the shaft 25 are the intermeshing gear wheels 29 so that the shaft 25 with its cutters is rotated at the same speed as the roller 16. Preferably the bearings 24 are vertically slidable in slots 30 of the standards 20 and are vertically adjustable by means of adjusting screws 31 extending up through the upper ends of the standards in an obvious and well known manner.

Disposed to one side of the belt 10 is a supporting frame 32 which carries the vertical shaft 33. Mounted upon this shaft is a disk 33ª carrying cutting knives 34, and extending over the top of the path of movement of these cutting blades or knives is a table 35 having a hopper 36 which opens through this table 35, the cutting blade 34 rotating immediately beneath this hopper 36. This portion of the table 35 and of the cutter 34 is disposed immediately over the conveyor belt 10 so that the slices of potatoes which are discharged from the cutters will drop down onto the belt of the conveyor 10 and thus be conveyed to the strip-cutting knives 26.

The shaft 33 is driven by means of a beveled gear wheel 37 mounted upon the shaft, in turn engaging a beveled gear wheel 38 mounted upon a short shaft 39, which shaft is mounted in bearings 40 and carries upon it the belt wheel 41 engaged by a belt 42 with a belt wheel 43 mounted upon the shaft 17. Thus it will be obvious that as the shaft 17 is driven by power, the apron in turn will drive the shaft 33.

In order to strip the strips of potatoes from the cutting disks 26 and from the peripheries of the spacers 27, we provide a comb-like stripper 44 which consists of a plate of metal having sufficient length to be attached at its ends to the standards 20 and having a plurality of fingers 45, these fingers extending downward and between the cutting disks 26 and bearing against the peripheries of the spacers 27.

The operation of this mechanism is as follows: The potatoes are fed by hand into the hopper 36 and as they move downward are cut into slices by the slicing blade 34 and discharged as slices onto the conveyor 10. This conveyor carries these slices, as illustrated in Figure 1, forward and between the rollers 16 and the cutting disks 26 and the potatoes are thus cut into strips having a length equal to the length of the potato slicers and discharged, as shown in Figure 2, as shoe string potatoes.

One of the principal advantages of this machine resides in the fact that the potato does not come in contact with the hand of the operator from the time the potato is placed within the hopper until it is taken out of the container within which the elongated strips of potato are dropped, and inasmuch as the slices of potato drop onto a moving belt, it follows that the slices are disposed in consecutive order, that no slice overlaps another slice, and that there is no contact with the hand at any time. The potato slices pass almost immediately from the slicing machine to the stripping knives so that the potato is still firm and in good condition when it reaches the stripping knives so that it may be cut up into longitudinally extending strips and these strips may be immediately dropped into a pan of water so as to keep the potato fresh and in thoroughly first-class condition. What applies to potatoes applies equally well to other vegetables which require that the slices shall be immediately cut into longitudinal strips and dropped into water without the touch of the hand.

We are aware that it has been proposed to cut potatoes into elongated strips or into dices by forcing the potatoes through devices having crossed knives, but it has been found in actual practice that the potatoes will wedge in the spaces between the knives because the cutting edge of the blade is necessarily much thinner than the remainder of the blade, and where the product is confined in a small network it requires so much pressure to force it through that it will bruise and crush the product in the operation. Manufacturers of the most commonly used machines for the cutting of French fried potatoes admit that a pressure of approximately five hundred pounds is required to force a medium to a large sized potato through the cross blade cutters. It will be readily seen that such a pressure, when applied to softer vegetables or fruits, would ruin the product before it left the machine. Our machine requires practically no pressure at any stage of the operation, and it has been demonstrated that even boiled potatoes may be cut without breakage in our machine.

A potato cutter of the character above described has been tested in use and found to be thoroughly effective and very rapid in its action so that it is a relatively easy matter to cut up large quantities of shoe string potatoes instead of having to perform this operation by hand. This makes the machine particularly convenient for large restaurants, hotels and for use where shoe string potatoes are to be prepared for banquets, etc.

While we have illustrated certain details of construction and arrangement of parts which we have found to be particularly effective, we do not wish to be limited thereto as it is obvious that many changes might be made in these details without departing from the spirit of the invention as defined in the appended claims.

We claim:—

1. A machine for cutting potatoes in strips including a conveying belt, potato slicing means disposed over the belt and discharging sliced potatoes thereon as the belt moves, means disposed above the said element and the conveyor and carrying parallel cutting knives extending parallel to the path of movement of the conveyor and bearing against the surface thereof, and means for simultaneously driving the conveyor and the slicing means.

2. A machine for cutting potatoes into strips including a conveyor belt, a shaft extending transversely to the belt carrying a plurality of cutting disks bearing against the belt, means disposed in advance of the cutting disks for slicing the potatoes and discharging the slices successively upon the moving belt, and means for simultaneously driving the conveyor belt, the roller, and the potato slicing means.

3. A machine for cutting potatoes into strips including an endless conveyor, means for driving the conveyor, slicing means disposed above the conveyor and adapted to discharge successive slices upon the moving conveyor belt, one behind the other, and means disposed above the conveyor belt and engaging said slices and cutting the slices into longitudinal strips.

In testimony whereof we hereunto affix our signatures.

STACY J. COX.
RALPH C. COX.